(12) United States Patent
Ayyapureddi et al.

(10) Patent No.: US 12,248,567 B2
(45) Date of Patent: Mar. 11, 2025

(54) ROW HAMMER INTERRUPTS TO THE OPERATING SYSTEM

(71) Applicant: Micron Technology, Inc., Boise, ID (US)

(72) Inventors: Sujeet Ayyapureddi, Boise, ID (US); Tamara Schmitz, Boise, ID (US); Edmund Gieske, Boise, ID (US); Nicolo Izzo, Boise, ID (US); Markus H. Geiger, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 169 days.

(21) Appl. No.: 17/940,785

(22) Filed: Sep. 8, 2022

(65) Prior Publication Data

US 2023/0237152 A1  Jul. 27, 2023

Related U.S. Application Data

(60) Provisional application No. 63/301,993, filed on Jan. 21, 2022.

(51) Int. Cl.
*G06F 21/55* (2013.01)
*G06F 21/54* (2013.01)

(52) U.S. Cl.
CPC ............ *G06F 21/554* (2013.01); *G06F 21/54* (2013.01); *G06F 21/556* (2013.01)

(58) Field of Classification Search
CPC ...... G06F 21/554; G06F 21/54; G06F 21/556; G06F 21/55
See application file for complete search history.

(56) References Cited

U.S. PATENT DOCUMENTS

| | | | | |
|---|---|---|---|---|
| 9,721,643 | B2* | 8/2017 | Bains | G11C 29/50012 |
| 9,812,185 | B2* | 11/2017 | Fisch | G11C 11/4087 |
| 10,210,925 | B2* | 2/2019 | Bains | G11C 11/406 |
| 10,636,476 | B2* | 4/2020 | Nale | G11C 11/4078 |
| 10,950,288 | B2* | 3/2021 | Nale | G06F 3/0619 |
| 2014/0281206 | A1* | 9/2014 | Crawford | G11C 11/40611 |
| | | | | 711/106 |
| 2015/0200002 | A1* | 7/2015 | Lin | G11C 11/40618 |
| | | | | 711/106 |
| 2015/0279441 | A1* | 10/2015 | Greenberg | G11C 11/406 |
| | | | | 365/49.1 |
| 2018/0158507 | A1* | 6/2018 | Bang | G11C 11/40611 |
| 2019/0347019 | A1* | 11/2019 | Shin | G06F 3/0629 |
| 2019/0377679 | A1* | 12/2019 | Murphy | G06F 3/0634 |
| 2020/0210076 | A1* | 7/2020 | Murphy | G06F 12/1441 |
| 2021/0390179 | A1* | 12/2021 | Hahn | G06F 21/71 |
| 2022/0121398 | A1* | 4/2022 | Nale | G06F 3/0659 |
| 2022/0209933 | A1* | 6/2022 | Chhabra | G06F 21/602 |

(Continued)

*Primary Examiner* — Hosuk Song

(57) ABSTRACT

A system and method detect a row hammer attack on the memory media device and generates a hardware interrupt based on the detection of the row hammer attack. This row hammer interrupt is communicated to an operating system of a host computing device, which in turn performs an interrupt service routine including generating a command to perform a row hammer mitigation operation. This command is provided to the memory controller which performs the row hammer mitigation operation in response to the command such as activating victim row(s) of the memory media device or throttling data traffic to the memory media device.

20 Claims, 7 Drawing Sheets

(56) References Cited

U.S. PATENT DOCUMENTS

| | | | |
|---|---|---|---|
| 2023/0128653 A1* | 4/2023 | You | G11C 11/4063 365/218 |
| 2023/0195889 A1* | 6/2023 | Gurumurthi | G11C 11/40611 726/22 |
| 2023/0205872 A1* | 6/2023 | Kotra | G06F 21/554 726/23 |

* cited by examiner

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Row Accessed | 9 | 7 | 6 | 7 | 10 | 11 | 12 | 7 | 7 | 9 | 6 | 6 | 9 | 9 | 6 | 6 |
| Cntr 1 Addr | 9 | 9 | 9 | 9 | 9 | 9 | 9 | 12 | 12 | 12 | 12 | 12 | 12 | 12 | 12 | 12 |
| Cntr 1 Count | 1 | 1 | 1 | 1 | 1 | 1 | 1 | 2 | 2 | 2 | 2 | 2 | 2 | 2 | 2 | 2 |
| Cntr 2 Addr | | 7 | 7 | 7 | 7 | 7 | 7 | 7 | 7 | 7 | 7 | 7 | 7 | 7 | 7 | 7 |
| Cntr 2 Count | | 1 | 1 | 2 | 2 | 2 | 2 | 3 | 4 | 4 | 4 | 4 | 4 | 4 | 4 | 4 |
| Cntr 3 Addr | | | 6 | 6 | 6 | 11 | 11 | 11 | 11 | 11 | 11 | 11 | 9 | 9 | 9 | 9 |
| Cntr 3 Count | | | 1 | 1 | 1 | 1 | 2 | 2 | 2 | 2 | 2 | 2 | 3 | 4 | 4 | 4 |
| Cntr 4 Addr | | | | | 10 | 10 | 10 | 10 | 10 | 9 | 6 | 6 | 6 | 6 | 6 | 6 |
| Cntr 4 Count | | | | | 1 | 1 | 1 | 1 | 1 | 2 | 3 | 4 | 3 | 4 | 5 | 6 |
| Total | | | | | | | | | | | | | | | | 16 |

FIGURE 7

ROW HAMMER INTERRUPTS TO THE OPERATING SYSTEM

CROSS REFERENCE TO RELATED APPLICATIONS

This application claims priority from U.S. Provisional Application No. 63/301,993 filed Jan. 21, 2022, the contents of which is hereby incorporated by reference. Additionally, this application is related to the following commonly assigned U.S. Patent Applications: U.S. Pat. No. 11,994,990 B2 issued May 28, 2024, entitled "Memory Media Row Activation-Biased Caching;" U.S. Pat. No. 12,119,043 issued Oct. 13, 2024, entitled "Practical and Efficient Row HammerError Detection," U.S. Pat. No. 12,182,413 B2 issued Dec. 31, 2024, entitled "Area-OptimizedRow Hammer Mitigation;" U.S. Non-Provisional Application No. 17/941,655 filed Sep. 9, 2002, entitled "Aliased Row Hammer Detector;" U.S. Pat. No. 12,086,459 B2 issued Sep. 10, 2024, entitled "Optimized Control of the Commands Running in a Cache;" U.S. Pat. No. 11,977,769 B2 issued May 7, 2024, entitled "Control of the Back Pressure Based on a Total Number of Buffered Read and Write Entries;" and U.S. Non-Provisional Application No. 17/903,493 filed Sep. 6, 2022, entitled "Arbitration Policy to Prioritize Read Command Dequeing by Delaying Write Command Dequeing," the contents of each of which is hereby incorporated by reference.

FIELD OF TECHNOLOGY

The present disclosure relates to generating a hardware interrupt for an operating system of a host computing device as a result of detecting a row hammer attack on a memory media device.

BACKGROUND

Memory devices (also referred to as "memory media devices") are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. SRAM memory may maintain their programmed states for the duration of the system being powered on. Non-volatile memory cells (e.g., NAND memory cells) may maintain their programmed states for extended periods of time even in the absence of an external power source.

Memory devices may be coupled to a host (e.g., a host computing device) to store data, commands, and/or instructions for use by the host while the computer or other electronic system is operating. For example, data, commands, and/or instructions can be transferred between the host and the memory device(s) during operation of a computing or other electronic system. A controller, referred to as a "memory controller", may be used to manage the transfer of data, commands, and/or instructions between the host and the memory devices.

DRAM is organized as an array of storage cells with each cell storing a programmed value. As noted above, the cells can lose their programmed values if not periodically refreshed. Thus, the rows are refreshed at a fixed interval often referred to as the "refresh interval". The refresh is also called a "row activation". In a row activation, a row in the DRAM device is read, error corrected and written back to that same physical row. Data corruption caused by "row hammer events" (also referred to as "row hammer attacks") are a significant risk in recent DRAM devices.

A row hammer event occurs when a particular row in a media device is accessed (or activated) too many times, that is, more than a row hammer threshold (RHT) number of times, in an "activation interval" (i.e., the interval between two refresh/activation events). Specifically, when a particular row (an "aggressor row") is accessed more than a RHT number of times during an activation interval, one or more rows ("victim rows") that are physically proximate to that particular row in the DRAM media can be affected as a result of the frequent activation of the particular row, and data corruption of the one or more rows may occur. Due to various physical effects of shrinking manufacturing process geometries, the RHT of memory devices has decreased to a level at which even normal computer system programs can inadvertently corrupt their own data or the data of another program sharing the same system's memory. Conventional row hammer detection techniques are either practical but imperfect allowing data corruption or severe performance degradation, or perfect but impractically costly in required resources.

Conventional row hammer detector algorithms, such as "Address Sampling" and "Priority CAM" (priority content addressable memory) are probabilistic and thus cannot guarantee perfect (i.e., complete, accurate, and precise) prevention of data corruption in any and all row hammer scenarios. If an aggressor (e.g., a malicious attacker) knows sufficient details of these conventional row hammer detection methods and their implementation, the aggressor can attack their weaknesses to bypass or break them and corrupt data.

The "direct" or "perfect" row tracking method, in which a counter is maintained for each row in the DRAM media, is a known perfect row hammer detection algorithm, but its implementation requires both amounts of memory and operating power that are too high to be practically useful.

Guaranteed row hammer event elimination is compelling for any memory device, but is especially compelling for systems such as, for example, hyperscale datacenters (HSDC). In HSDCs, typically multiple customers share processors and memory. A malicious attacker can use row hammer attacks to silently (e.g., without detection) corrupt other customers' data to possibly escalate its privilege to take control of more system resource or compromise data center security.

Row hammer attacks still constitute a growing problem and is at a point where they may not be mitigated by the memory device alone. For example, the malicious actor may bring several rows of the memory media device to just below the RHT. The malicious actor may then activate each of these rows in quick succession such that each of these rows has exceeded the RHT. Suddenly, there is thus an avalanche or waterfall of rows that need row hammer mitigation. This results in a denial of service as the memory media device is overwhelmed and must take some time off, at least in part due to its limitations on capabilities and back pressure caused by the operations already queued up or being performed by the memory media device. The memory controller must disadvantageously hold off on executing commands received from the host and/or hold back traffic to the memory device. The memory media device itself may therefore not be able to effectively mitigate against such a sustained row hammer attack.

BRIEF DESCRIPTION OF THE DRAWINGS

FIG. 7 is an illustration of the maintenance of a limited number of counters in accordance with the space saving algorithm.

DETAILED DESCRIPTION

Currently, row hammer corruption is indistinguishable from other soft errors. Modern workloads thrash processor caches and cause unintentional row hammer scenarios. Detected errors beyond a threshold rate require physical service of the dual in-line memory modules (DIMMs) which are often returned to the supplier for credit. Therefore, improved techniques for mitigating soft errors such as row hammer errors are desired. Embodiments of the present disclosure provide such improved techniques.

Figure 1:
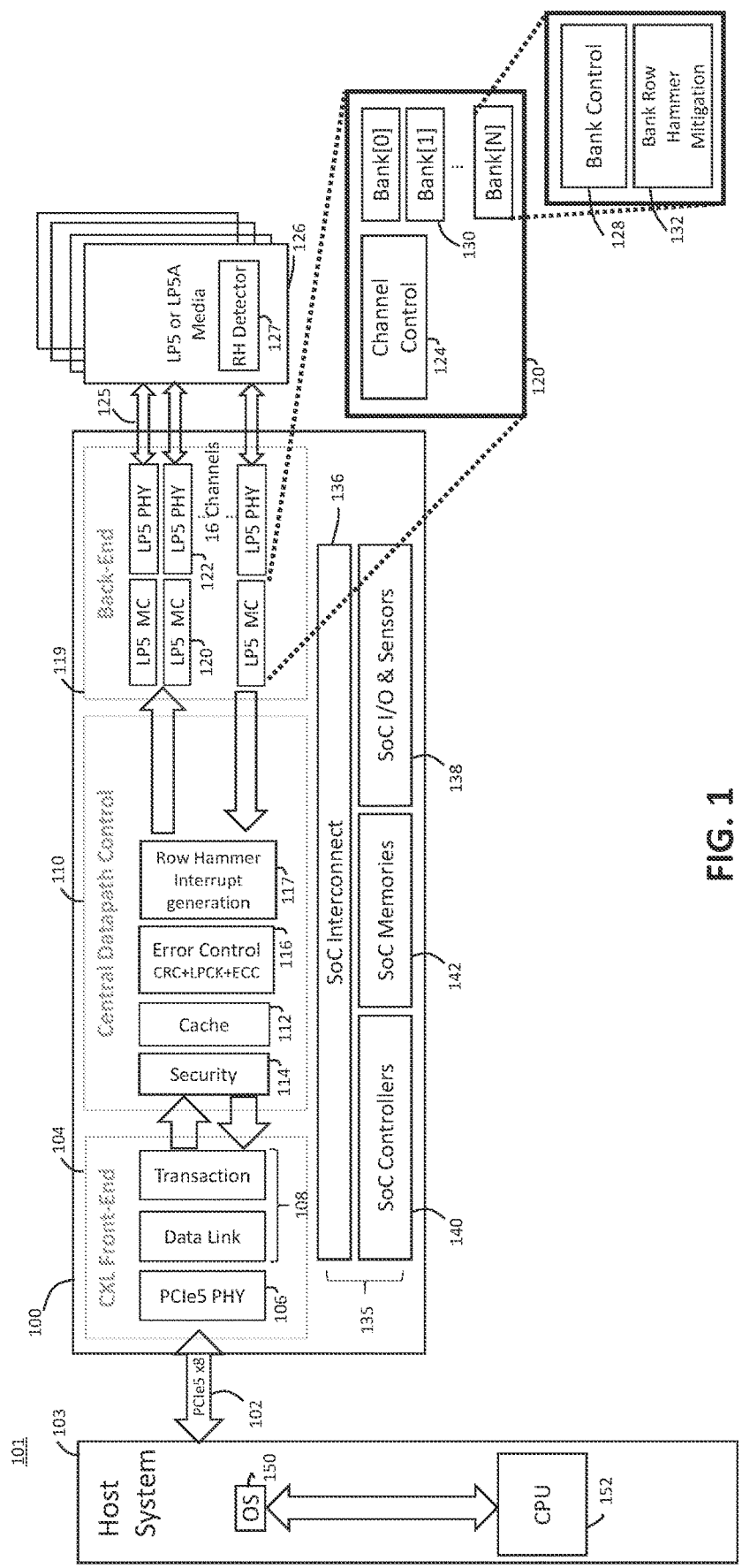
FIG. 1 illustrates an example functional block diagram in the form of a computing system including a memory controller configured for detecting row hammer attacks and generating row hammer interrupt(s) in accordance with some example embodiments of the present disclosure.

FIG. 1 illustrates an example functional block diagram in the form of a computing system 101 including a memory controller 100 configured for detecting row hammer attacks in accordance with some embodiments of the present disclosure. The computing system 101 can detect and mitigate row hammer attacks on one or more memory devices 126. The memory controller 100 comprises a front end portion 104, a central controller portion 110, a back end portion 119, and a management unit 135. The memory controller 100 can be coupled to a host 103 (i.e., host system or host computing device 103) and memory device 126. In some embodiments, memory device 126 may be a DRAM device. The host 103 at least includes an operating system 150 and a central processing unit (CPU) 152. The operating system 150 and CPU 152 of the host 103 may communicate with each other.

The front end portion 104 includes an interface 106 to couple the memory controller 100 to the host 103 through one or more input/output (I/O) lanes 102. The communications over I/O lanes 102 may be according to a protocol such as, for example, Peripheral Component Interconnect Express (PCIe). In some embodiments, the plurality of I/O lanes 102 can be configured as a single port. Example embodiments are not limited by the number of I/O lanes, whether or not the I/O lanes belong to a single port, or the communication protocol for communicating with the host.

The communications over I/O lanes 102 to the host 103 may include one or more row hammer interrupts as well as other types of interrupts and data including those from other devices (not shown). The communications over I/O lanes 102 to the host 103 may also include additional information relating to the row hammer attack that is provided from the memory controller 100. This additional information may include the priority of the interrupt, the type of interrupt, a location pointer for other ancillary information, an actual count of the number of activations for each of the row(s) of the memory device 126, the total number of counts exceeding the row hammer threshold for an attacked row, and/or a specific physical row address (physical address ID) of one or more particular rows of the memory device 126 such as the aggressor and/or victim rows. This additional information can be communicated over the I/O lanes 102 to the host 103 along with the row hammer interrupt or in alternative embodiments separately from the transmission of the row hammer interrupt.

The interface 106 of the memory controller 100 receives data and/or commands from host 103 through I/O lanes 102. These data and/or commands from the host 103 may include data and/or commands to perform a row hammer mitigation operation that has been determined by the host 103 based upon its evaluation and processing of the row hammer interrupt and additional information relating to the row hammer attack that was previously received by the host The commands to perform the row hammer mitigation operation may include commands to refresh one or more victim rows of the row hammer attack, reduce or completely shut off data traffic to the memory media device, and/or reconfiguring system hardware and/or software of the memory controller and/or memory device.

In an embodiment, the interface 106 is a physical (PHY) interface configured for PCIe communications. The front end portion 104 may include interface management circuitry 108 (including data link and transaction control) which may provide higher layer protocol support for communications with host 103 through PHY interface 106.

The central controller portion 110 is configured to control, in response to receiving a request or command from host 103, performance of a memory operation. The memory operation can be a memory operation to read data from, or write data to, memory device 126. Based on the request for command from the host 103, the memory operation may be to reduce or completely shut down the amount or rate of data read from or written to the memory device 126 to mitigate against a row hammer attack on the memory device 126 or may be to activate particular rows of the memory device 126 such as one or more victim rows proximate to the aggressor row of the memory device 126. The central controller portion 110 may comprise a cache memory 112 to store data associated with the performance of the memory operation, a security component 114 configured to encrypt the data before storing, and to decrypt data after reading, the data in memory device 126.

In some embodiments, in response to receiving a request from host 103, data from host 103 can be stored in cache lines of cache memory 112. The data in the cache memory can be written to memory device 126. An error correction component 116 is configured to provide error correction to data read from and/or written to memory device 126. In some embodiments, the data can be encrypted using an encryption protocol such as, for example, Advanced Encryption Standard (AES) encryption, before the data is stored in the cache memory. In some embodiments, the central controller portion 110 can, in response to receiving a request from host 103, control writing of multiple pages of data substantially simultaneously to memory device 126.

Figure 5:
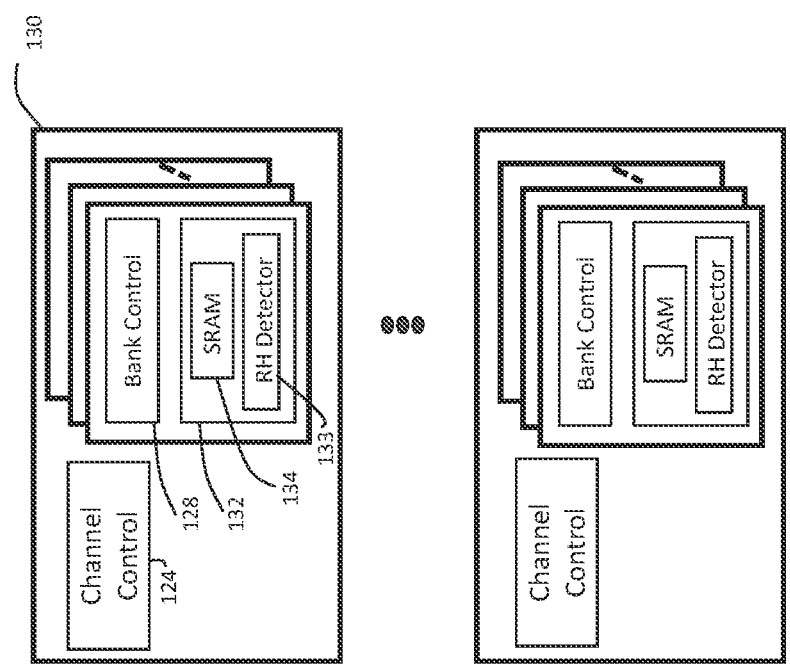
FIG. 5 illustrates a logical block diagram of a per-bank row hammer detection and mitigation component, according to some embodiments.

A row hammer interrupt generation component 117 of the memory controller 100 generates a row hammer interrupt when a row hammer detector (e.g., a row hammer detector (s) 133 of the memory controller 100 [see FIG. 5] and/or a row hammer detector(s) 127 provided in the storage memories of the memory device 126) detects that a row hammer attack has occurred or predictively detects that a row hammer attack is in progress or likely or about to occur.

More specifically, generation of a row hammer interrupt by the row hammer interrupt generation portion 117 can be triggered when the row hammer detector 133 of the memory controller 100 internally generates a signal that a row hammer attack has or is in progress or predicted to occur or when a signal has been received from one or more of the row hammer detectors 127 of the memory device 126 indicating that a row hammer attack has occurred or is in progress or predicted to occur. Accordingly, the detection of the row hammer attack can be accomplished on side of the memory controller 100 and/or the side of the memory device 126.

The management unit 135 is configured to control operations of the memory controller 100. The management unit may recognize commands from the host 103 including commands from the host 103 that were generated in response to a row hammer interrupt earlier generated by the memory controller and accordingly manage the one or more memory devices 126. In some embodiments, the management unit 135 includes an I/O bus 138 to manage out-of-band data, a management unit controller 140 to execute a firmware whose functionalities include, but not limited to, monitoring and configuring the characteristics of the memory controller 100 (e.g., in response to commands from the host 103 that were generated in response to a row hammer interrupt), and a management unit memory 142 to store data associated with memory controller 100 functionalities.

The management unit controller 140 may also execute instructions associated with initializing and configuring the characteristics of the memory controller 100 (again, e.g., in response to commands from the host 103 that were generated in response to a row hammer interrupt). An endpoint of the management unit 135 can be exposed to the host system 103 to manage data through a communication channel using the I/O bus 138.

A second endpoint of the management unit 135 can be exposed to the host system 103 to manage data through a communication channel using interface 106. In some embodiments, the characteristics monitored by the management unit 135 can include a voltage supplied to the memory controller 100 or a temperature measured by an external sensor, or both. Further, the management unit 135 can include a local bus interconnect 136 to couple different components of the memory controller 100. In some embodiments, the local bus interconnect 136 can include, but is not limited to, an advanced high performance bus (AHB).

The management unit 135 can include a management unit controller 140. In some embodiments, the management unit controller 140 can be a controller that meets the Joint Test Action Group (JTAG) standard and operate according to an Inter-Integrate Circuit (I2C) protocol, and auxiliary I/O circuitry. As used herein, the term "JTAG" generally refers to an industry standard for verifying designs and testing printed circuitry boards after manufacture. As used herein, the term "I2C" generally refers to a serial protocol for a two-wire interface to connect low-speed devices like microcontrollers, I/O interfaces, and other similar peripherals in embedded systems.

The back end portion 119 of the memory controller 100 is configured to couple to one or more types of memory devices (e.g. DRAM media 126) via (e.g., through) a plurality of channels 125, which can be used to read/write data to/from the memory devices 126, to transmit commands to memory device 126, to receive status and statistics from memory device 126, etc. including command and data relating to the row hammer attack The management unit 135 can couple, by initializing and/or configuring the memory controller 100 and/or the memory device 126 accordingly (e.g., in response to any commands and data from the host 103 that were generated in response to a row hammer interrupt), the memory controller 100 to external circuitry or an external device, such as host 103 that can generate requests to read or write data to and/or from the memory device(s).

The management unit 135 is configured to recognize received commands from the host 103 and to execute instructions to apply a particular operation code associated with received host commands for each of a plurality of channels coupled to the memory device 126 accordingly (again, e.g., in response to any commands and data from the host 103 that were generated in response to a row hammer interrupt).

In some embodiments, the data and/or other signals transmitted from the memory device 126 over the plurality of channels 125 to the memory controller 100 may signal that one or more of the row hammer detectors 127 of the memory device 126 has detected that a row hammer attack has occurred, is occurring, or is predicted to occur on the memory device 126. The data and/or other signals transmitted from the memory device 126 over the plurality of channels 125 to the memory controller 100 may include additional information regarding the row hammer attack such as the physical row identifiers of the rows involved in the row hammer attack such as the physical row identifiers of the aggressor row(s) and/or victim row(s) which are involved in the row hammer attack, the actual count of the number of activations of rows involved in the row hammer attack, and/or the total number of rows exceeding the threshold, etc.

In some embodiments, the data and/or commands transmitted from the memory controller 100 over the plurality of channels 125 to the memory device 126 will result in one or more row hammer mitigation operations to be performed such as activating victim rows of the row hammer attack, temporarily halting reading/writing data from/to the affected rows in memory device 126, reducing the amount or rate of data transmission to memory device 126, and reconfiguring hardware or software in the memory controller 100 and/or memory device 126. Mitigation by the CPU/OS may also include identifying malicious actors (e.g., programs) causing the row hammer attacks and restricting such identified actors or certain actions/events initiated by such identified actors.

The back end portion 119 includes a media controller portion comprising a plurality of media controllers 120 and a PHY layer portion comprising a plurality of PHY interfaces 122. In some embodiments, the back end portion 119 is configured to couple the PHY interfaces 122 to a plurality of memory ranks of the memory device 126. Memory ranks can be connected to the memory controller 100 via a plurality of channels 125. A respective media controller 120 and a corresponding PHY interface 122 may drive a channel 125 to a memory rank. In some embodiments, each media controller 120 can execute commands independent of the other media controllers 120. Therefore, data can be transferred from one PHY interface 122 through a channel 125 to memory device 126 independent of other PHY interfaces 122 and channels 125.

Each PHY interface 122 may operate in accordance with a PHY layer that couples the memory controller 100 to one or more memory ranks in the memory device 126. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium. In some embodiments, the physical data transmission medium can be a plurality of channels 125. As used herein, the term "memory ranks" generally refers to a plurality of memory chips (e.g., DRAM memory chips) that can be accessed simultaneously. In some embodiments, a memory rank can be sixty four (64) bits-wide and each memory rank can have eight (8) pages. In some embodiments, a page size of a first type of memory device can be larger than a page size of the second type of memory device. Example embodiments, however, are not limited to particular widths of memory ranks or page sizes.

Each media controller 120 may include a channel control circuitry 124 and a plurality of bank control circuitry 128 where a respective one of the plurality of bank control circuitry 128 is configured to access a respective bank 130 of the plurality of banks on the media device 126 accessed by the respective media controller 120. As described in more detail below, a memory error detector, or more particularly a respective per-bank row hammer detection and mitigation circuitry 132, may be configured for each bank 120 in each channel in embodiments of this disclosure.

Rank, channel, and bank can be considered hardware-dependent logical groupings of storage locations in the memory device 126. The mapping of rank, channel and bank logical groupings to physical storage locations or rows in the memory device 126 may be preconfigured or may be configurable in some embodiments by the memory controller in communication with the memory device 126.

In some embodiments, the memory controller 100 can be a CXL compliant memory system (e.g., the memory system can include a PCIe/CXL interface). CXL is a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When the memory controller 100 is CXL compliant, the interface management circuitry 108 (including data link and transaction control 108) may use CXL protocols to manage the interface 106 which may comprise PCIe PHY interfaces.

According to some embodiments, the memory device 126 includes one or more DRAM devices. In some embodiments, main memory is stored in DRAM cells that have high storage density. DRAM cells lose their state over time. That is, the DRAM cells must be refreshed periodically, hence the name "Dynamic". DRAM can be described as being organized according to a hierarchy of storage organization comprising DIMM, rank, bank, and array. A DIMM comprises a plurality of DRAM chips, and the plurality of chips in a DIMM are organized into one or more "ranks". Each chip is formed of a plurality of "banks". A bank is formed of one or more "rows" of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64B request). Each array provides a single bit to the output pin in a cycle (for high density and because there are few pins). DRAM chips are often described as xN, where N refers to the number of output pins; one rank may be composed of eight x8 DRAM chips (e.g., the data bus is 64 bits). Banks and ranks offer memory parallelism, and the memory controller 100 may schedule memory accesses to maximize row buffer hit rates and bank/rank parallelism.

In the embodiment illustrated in FIG. 1, the memory device 126 is low power double data rate (LPDDR) LP5 or LP5A DRAM media. However, embodiments are not limited thereto, and memory device 126 may comprise one or more memory media of any memory media types, such as, but not limited to, types of DRAM, that are subject to row hammer attacks or similar memory attacks.

Each of the plurality of media controllers 120 can receive a same command and address and drive the plurality of channels 125 substantially simultaneously. By using the same command and address for the plurality of media controllers, each of the plurality of media controllers 120 can utilize the plurality of channels 125 to perform the same memory operation on the same plurality memory cells. Each media controller 120 can correspond to a RAID component. As used herein, the term "substantially" intends that the characteristic need not be absolute but, is close enough so as to achieve the advantages of the characteristic.

For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, the multiple memory controllers can be utilized such that they are writing data to the memory devices at the same time regardless of whether one of the media controllers commences or terminates prior to the other.

Figure 2:
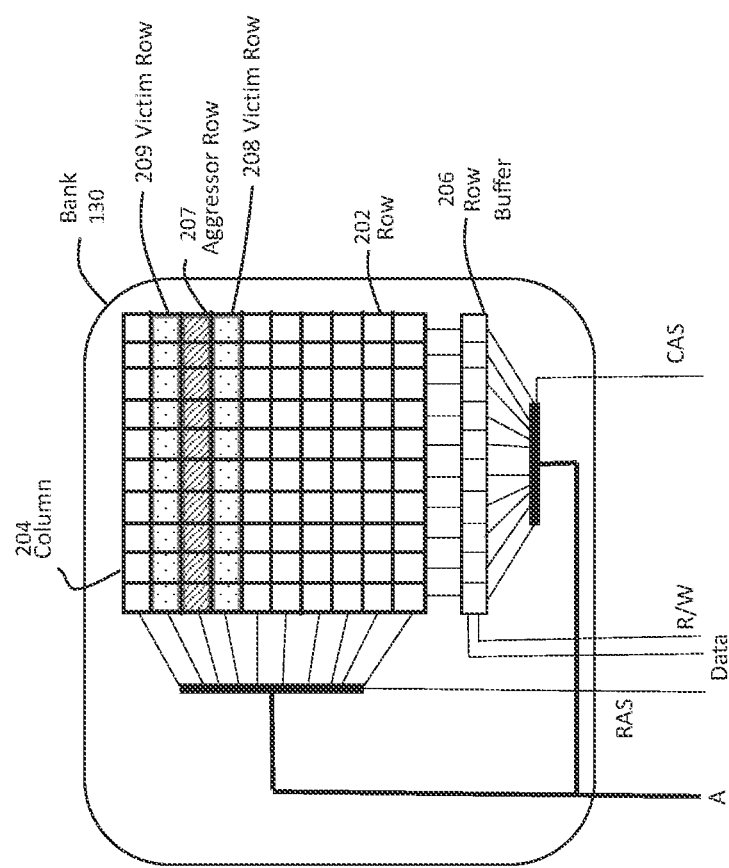
FIG. 2 illustrates a schematic view of a memory bank in a DRAM media device.

FIG. 2 illustrates a schematic view of a memory bank 130 viewed in a DRAM device such as memory device 126. The illustrated bank 130 represents a 10×10 array of cells organized in 10 rows (e.g., row 202) and 10 columns (e.g., column 204). The bank is stored to or read from, one row at a time, via a row buffer 206. Each cell in the array is accessed by providing a row address and a column address. The address bus, a row access strobe signal, a column access strobe signal (shown in FIG. 2 as A, RAS, CAS, respectively) are used to access particular memory locations in the array. The row buffer 206 and the data or read/write signals are used for the data to be read from or stored to memory locations.

In some memory devices 126, a counter, which is operatively coupled to or a part of the row hammer detector 127, may be associated with a row to keep track of the number of times that row has been activated during a particular time interval. For example, the counter may be initialized at the beginning of each refresh interval and be incremented for each access to that row during that refresh interval. As counted by the counter, if the number of times that that a particular row of the memory device 126 has been activated during a particular time interval exceeds the row hammer threshold for that row, then the row hammer detector 127 detects a row hammer attack of that aggressor row and sends a corresponding detector signal flagging this detected state to the memory controller 100 so that the memory controller 100 may in turn generate and send a row hammer interrupt to the host 103 and other information related to the row hammer attack.

In example embodiments involving perfect tracking implementations, a respective counter is associated with each row. In other example embodiments (discussed in more detail below), the number of counters maintained is much smaller than the total number of rows in the memory device(s) attached to the memory controller.

Figure 3:
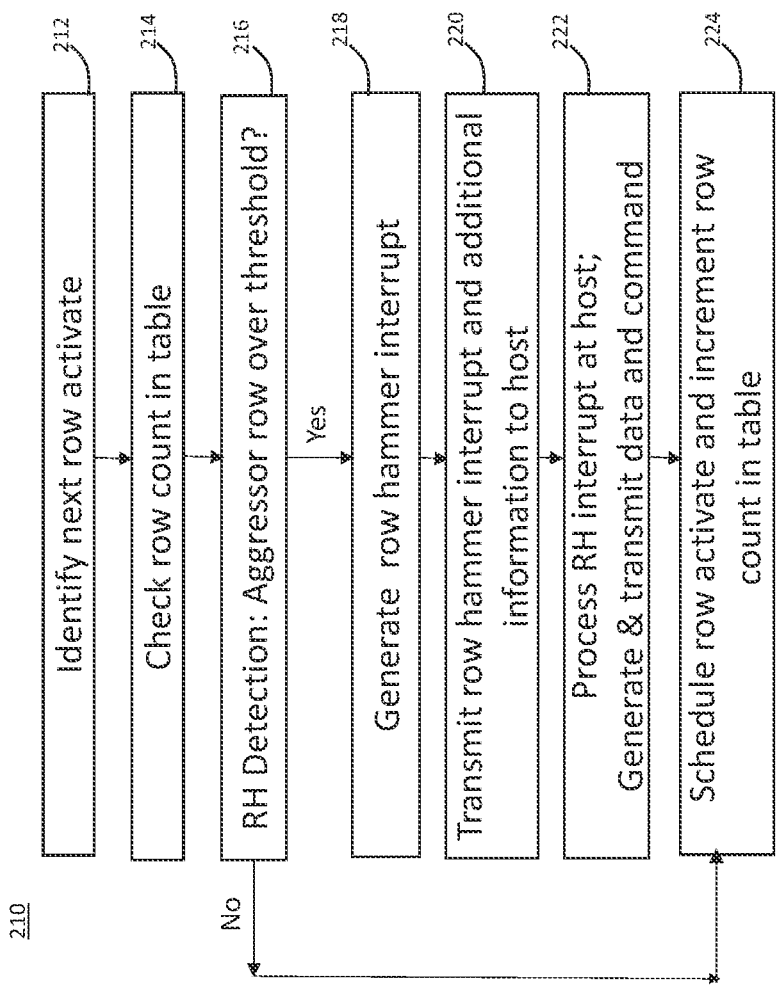
FIG. 3 illustrates a flowchart depicting a process for row hammer detection, row hammer interrupt generation, and row hammer mitigation operation, according to some example embodiments.

FIG. 3 illustrates a flowchart 210 depicting a basic implementation flow of example embodiments to implement row hammer mitigation. The row hammer mitigation includes a row hammer detection, a row hammer interrupt generation, and a responsive row hammer mitigation operation. A variety of responsive row hammer mitigation operations are possible. These row hammer mitigation operations include activating victim rows (e.g., DRFM response) to refresh them. The refreshing eliminates the effects of row hammer effects, with the operating system 150 an/or CPU 152 of the host 103. A command is issued to identify the victim rows to be refreshed or alternatively identifying the aggressor row. The memory controller 100 and/or memory device 126 can use the aggressor row to determine the victim rows to be refreshed. In either case, the command is issued by the host 103 after it receives and processes a row hammer interrupt generated by the memory controller 100 in response to detection of the row hammer attack.

Additionally, and/or alternatively, the responsive row hammer mitigation operation may include completely shutting down or at least reducing the amount or rate of data traffic to the memory device 126 (since the row hammer attack needs a certain bandwidth) as instructed by a command issued by the operating system 150 and/or CPU 152 of the host 103 after they receive and process an interrupt generated by the memory controller 100 in response to detection of the row hammer attack.

Additionally, and/or alternatively to any of the row hammer mitigation operations mentioned above, the responsive row hammer mitigation operation may include reconfiguring the hardware and/or software in the computing system 101, such as reconfiguring the hardware and/or software in the memory controller 100 and/or memory device 126. Another additional and/or alternative row hammer mitigation operation may include deprioritizing or halting execution of software in the computing system 101, such as deprioritizing or halting execution of software in the memory controller 100.

When a request is received to access a row, which may be referred to as the "aggressor row" (e.g., row 207 in FIG. 2) in this disclosure, in the memory device 126, at operation 212 that row is identified as the next row to activate. At operation 214, a value of a counter configured to keep track of the number of accesses to the aggressor row in a predetermined time period is checked. At operation 216, it is determined whether the value of the counter is above the RHT in order to determine whether a row hammer attack has occurred.

When the RHT is exceeded for the aggressor row 207, the integrity of the data in one or more rows (referred to as "victim rows"; see e.g., rows 208 and 209 in FIG. 2) physically adjacent to the aggressor row 207 cannot be guaranteed. The RHT may be factory set or may be configured at boot time. If the value is above the RHT, then a row hammer attack is detected and as a result of his detection, a row hammer interrupt is generated by the memory controller 100 in operation 218.

Other methodologies for determining a row hammer attack may be utilized such as a predictive algorithm which may predict that a potential row hammer attack is about to happen or is happening. A predictive methodology can thus be used to determine that a row hammer attack is in or about to be in progress in the near future. The predictive algorithm is based on the rate of count increase of the rows which have reached a certain percentage of the RHT. A high number of rows exceeding this percentage in a certain time frame is an indication of an impending Row Hammer attack capable of Detection of the row hammer attack may be performed at the memory controller 100 and/or at the memory device 126. That is, the row hammer detector(s) may be implemented by the memory controller 100 and/or by the memory device 126. FIG. 1 shows row hammer detectors 127 on the memory device 126, and FIG. 5 in connection with FIG. 1 shows row hammer detectors located in the memory controller 100 for respective corresponding banks of the memory device 126. However, embodiments are not limited to the detector being located in the memory device 126, or on the memory controller on a per-bank level. Some embodiments may include a detector at a per-channel level, or at a global level for all channels on the memory controller.

Each one of the particular row hammer detectors 127 may be configured to detect a potential row hammer attack for a corresponding one of the rows in the memory device 126. That is, each of the rows of the memory device 126 may be individually monitored for a row hammer attack.

Alternatively, only a partial subset of all of the rows may be monitored for a row hammer attack, thereby requiring a fewer number of counters and thus conserving computing resources on the side of the memory device 126. In either case, the row hammer detectors 127 may be implemented by processing circuitry in the memory device 126 such as specialized circuitry and/or a computer processor to perform the monitoring of each row of the memory device 126. The row hammer detectors 133 may be implemented by specialized circuitry and/or a computer processor in the memory controller 100 executing relevant software to perform the monitoring of rows of the memory device 126 for a row hammer attack.

In the case that row hammer detector(s) 133 in the memory controller 100 and row hammer detector(s) in the memory device 126 are both utilized (i.e., both the memory controller 100 and the memory device 126 detect a row hammer attack, thereby forming a multi-layer detector), the detection algorithms utilized on the memory controller side and the memory device side may be the same or they may be different. Detecting row hammer attacks on both the memory controller side and the memory device side may provide a redundancy check or a more failsafe system for the row hammer detection and hence row hammer mitigation operation.

In such a case, the memory device 126 and the memory controller 100 can both detect simultaneously if the row hammer attack has occurred, or alternatively one of the devices such as the memory device 126 can be configured such that it detects the row hammer attack first and then generates and transmits a corresponding detection signal to the memory controller 100 so that the interrupt can be in turn generated by the memory controller 100. Multiple row hammer detectors at different locations working in tandem reduces the chance that proper detection of a row hammer attack will be missed. If one row hammer detector erroneously misses detection of a row hammer attack, the other row hammer detector will likely catch it, thereby providing security redundancy via this dual detection of some present example embodiments.

As an example of different algorithms for row hammer detection, the row hammer detector(s) 127 on the side of the memory device 126 may use a different RH threshold than the RH threshold used by the row hammer detector(s) 133 used on the side of the memory controller 100. The different row hammer detectors can therefore have different considerations at which point they flag a row hammer attack in progress As another example of different algorithms for row hammer detection, one or more of the row hammer detector(s) 126 on the side of the memory device 126 may use an actual count of the activations of each row of the memory device 126, whereas one or more of the row hammer detectors 133 on the memory controller 100 (the memory controller 100 possibly having more computing power than the memory device 126) may use a predictive algorithm to predict that a potential row hammer attack is happening or will happen in the future.

If one or more of the row hammer detectors 127 of the memory device 126 detects a row hammer attack in operation 216, the memory device 126 can send a signal to the memory controller 100. This signal would indicate the row hammer status of the memory device 126 and would be processed by the memory controller 100 to in turn generate the row hammer interrupt in operation 218. Additional information such as the identity of the aggressor row, the actual count of the activations, total number of rows exceeding the row hammer threshold and/or counts above the threshold may also be transmitted from the memory device 126 to the memory controller 100.

If one or more of the row hammer detectors 133 of the memory controller 100 detects a row hammer attack in operation 216, an internal signal can be generated and further processed by the memory controller 100 to generate the row hammer interrupt in operation 218. Other information relevant to the row hammer attack could also be processed by the memory controller 100, such as the identity of the aggressor row, the actual count of the activations, and/or total number of rows exceeding the row hammer threshold.

In operation 220, the memory controller 100 transmits the row hammer interrupt to the operating system 150 of the host 103 through the front end portion 104 including interface 106. In particular, the memory controller 100 may transmit the row hammer interrupt to the CPU 152 of the host 103 which in turn can propagate the interrupt to the operating system 150. Alternatively, the memory controller 100 may transmit the row hammer interrupt directly to the operating system 150 of the host 103.

In operation 220, the memory controller 100 may also transmit other information relevant to the row hammer attack such as the identity of the aggressor row, the actual count of the activations, and/or total number of rows exceeding the row hammer threshold etc. to the host 103. This additional information may be communicated with the row hammer interrupt via some register storing ancillary data (e.g., a register at the memory controller 100 that can be accessed by the host 103). Other information may also be communicated with the interrupt such as the priority of the interrupt, the type of interrupt and/or a location pointer to other ancillary data.

Any of these pieces of additional information could alternatively be communicated from the memory controller 100 to the host 103 as a separate communication from the interrupt itself (e.g., before or after the communication of the row hammer interrupt from the controller 100 to the host system 103). This additional information will help the operating system 150 determine the scope of the problem resulting from the row hammer attack, determine how to react and generate the corresponding command for the row hammer mitigation operation to be performed.

As noted above, different row hammer detectors (e.g., row hammer detectors 133 on the memory controller 100 and row hammer detectors 127 on the memory device 126) can be utilized to detect a row hammer attack on the memory device 126. These different detectors can produce respective signals which are processed by the memory controller 100 to generate respective row hammer interrupts. That is, multiple row hammer interrupts can be generated by the memory controller 100 and transmitted to the operating system 150 of the host 103.

For example, a row hammer detector 133 on the memory controller 100 may execute a predictive algorithm to indicate that a row hammer attack may occur or is in the progress of occurring and thus generate a detector signal which is processed by the memory controller 100 to in turn generate a first row hammer interrupt which is then transmitted to the operating system 150 of the host 103 to enable the host 103 to know that a row hammer is predicted to occur. A row hammer detector 127 of the memory device 126 may execute an actual count to indicate that a row hammer attack has occurred and thus generate a signal that is processed by the memory controller 110 to in turn generate another row hammer interrupt which is then transmitted to the operating system 150 of the host 103 to enable the host 103 to confirm the earlier prediction.

In other words, after first receiving an interrupt and other information from the memory controller 100 indicating a prediction that there may be a row hammer attack on the memory device 126, the operating system 150 may still wait until the memory controller 100 provides a second interrupt and additional information so that an absolute confirmation of the row hammer attack may be obtained before initiating a row hammer mitigation operation. The operating system 150 of the host 103 may therefore receive multiple row hammer interrupts and instances of information in order to determine the scope of the row hammer problem and generate a command to appropriately respond to the determined row hammer attack.

The host 103 may periodically receive interrupts from various computer system devices requesting services from the host 103. The type of service required by the host depends on among other things the type of device, type of interrupt and addition information that is relevant to the current condition. These interrupts may include a row hammer interrupt(s) received from the memory controller 100 as a result of its processing of a detection signal(s) originating internally from one or more of the row hammer detectors 133 of the memory controller 100 itself and/or received from one or more of the row hammer detectors 127 of the memory device 126. The row hammer interrupt(s) sent to the host 103 is intended to inform the host 103 that a row hammer attack has been detected and obtain the host's service in performing a row hammer mitigation operation in response.

The host 103, including the operating system 150 and CPU 152 determines if an interrupt has been received. If no interrupt has been received, the host 103 returns to a watchdog state and continues to wait for an interrupt. For each received interrupt, the host's CPU 152 executes an interrupt service routine (ISR). Each of the separate ISRs are programmed for each of the types of interrupts generated by various devices within the computing system. When an interrupt is received, the host's CPU 152 processes the interrupt and other information such as any interrupt type and priority information. This processing includes temporarily suspending execution of its current program, saving the program state, and executing the relevant ISR corresponding to the type of interrupt. The executed ISR analyzes the type of interrupt an additional information received to help the operating system 150 of the host 103 determine the appropriate measure as to how to react. When the ISR's execution has been completed, the host's CPU 152 restores the program state and returns to the original program, starting where the program was interrupted.

Accordingly, in operation 222, the operating system 150 of the host 103 receives the interrupt directly from the memory controller 100 or through the CPU 152. The host 103 may determine, through for example its own processing of data such as priority and interrupt type and additional communications with the memory controller, that the type of the received interrupt is a row hammer interrupt, obtain additional information (e.g., information stored in registers of the memory controller 100 that is relevant to the row hammer attack), and begin execution of the appropriate ISR. The appropriate ISR may therefore executed at the host 103 for handling and processing the row hammer interrupt and additional information that is relevant to the row hammer interrupt and/or row hammer attack communicated from the memory controller 100.

As discussed above, this additional information may include a specific physical row address [physical row address ID] such as the row identifier of the aggressor and/or victim rows, actual count, total number of rows exceeding the threshold, priority of interrupt, location pointer for additional ancillary information, etc. describing the current row hammer state or situation of the memory device 126. The OS 150, based on the information it received, may figure out the identity of the process causing the Row Hammer activity and instruct the CPU 152 to terminate the process. The host 103 on account of the interaction between the OS 150 and the CPU 152 will instruct the memory controller to terminate activity on rows pertaining to the process identified by the OS 150 to be causing the Row Hammer activity. The memory controller generates the corresponding commands to the DRAM.

A row hammer mitigation operation is performed by the memory controller 100 based on the received command(s) received from the host 103. One type of row hammer mitigation operation that may be performed is a may be a Directed refresh management (DRFM) operation to refresh the physically adjacent rows (e.g., rows 208 and 209) on either side of the aggressor row 207. When this DRFM operation is performed, in some embodiments, the counters of the victim rows (e.g., rows 208 and 209) which are refreshed can be reset (e.g., set to 0) in addition to resetting the counter for the aggressor row. The number of physically adjacent rows to refresh may be preconfigured or may be dynamically determined (e.g., rows adjacent to rows 208 and 209 may also be refreshed).

As discussed above, another row hammer mitigation operations may be to throttle the amount of data read from or written to the memory device 126, reconfigure the hardware, throttle the software (customer or guest software), deprioritize the software, or to kill the software in the computing system 101 such as the hardware and/or software of the memory controller 100 and/or memory device 126. Examples of such reconfiguration of the hardware and/or software of the memory controller 100 and/or memory device 126 may include the operating system instructing to temporarily not accessing aggressor/victim rows; or may having the operating system itself directing its memory writes/stores to areas/devices avoiding the attacked rows.

If at operation 216 it was determined that the aggressor row 207 is not over the RHT at operation 224, the row activate for the aggressor row is scheduled and the counter for that row is incremented (e.g., incremented by 1).

In present example embodiments, computer architecture in the computing system 101 other than the memory device 126 such as the memory controller 100 and the host computer 103 including the operating system 150 and the CPU 152 are more involved in the row hammer detection and mitigation operation. For example, the memory controller 100 advantageously generates an interrupt in response to the row hammer detection and transmits this generated row hammer interrupt to the operating system 150 of the host 103. The memory controller 100 may itself perform the row hammer detection and/or process a detection signal received from the row hammer detection performed at the memory device 126 in order to generate the row hammer interrupt for the operating system 150 of host 103.

The computing load required to detect row hammer attacks, generate corresponding hardware interrupts in response to the detected row hammer attacks, and perform row hammer mitigation operation is more distributed over a greater amount of the computer architecture of the computing system 101. The required computing load to resolve row hammer issues is therefore spread out to other computer architecture (e.g., the memory controller 100 and/or host 103) which may have superior functionality and processing power than the memory device 126.

The memory controller 100 also has more scope to detect and to respond to a row hammer attack (relative to merely a memory device 126 detecting and responding), and the operating system of the host 103 has an even greater scope. The host 103 may therefore form a fuller HSDC-type system that may be receive/write information from/to many (e.g., 1000, 10000 or even more) different computing systems to manage them simultaneously. Communicating a row hammer attack to the operating system via the row hammer interrupts advantageously enables the row hammer attack to be dealt at that high hypervisor level.

The operating system 150 of the host 103 is capable of receiving and processing much more information from many more data sources and devices (relative to just the memory controller and/or memory device). For example, in view of its greater amount of information and management of many different computing systems including many memory devices, the operating system 150 of the host 103 can serve as a hypervisor such that a HSDC operator may identify row hammer attacks or potential row hammer attacks on multiple different memory devices and may further be able to identify that the row hammer attacks on the multiple different memory devices are all or mostly directed to the same account. The identity of a malicious attacker or other conclusions might therefore be established, and in any event, the ability to effectively resolve a security issue resulting from the row hammer attack is enhanced by virtue of the information being collectively obtained at a high level by the host 103 forming a fuller HSDC-type system.

As discussed in detail above, memory device 126 such as, for example, one or more DRAM DIMMs, can be subject to row hammer attacks, and several approaches are being used to either eliminate or reduce the effects of such attacks. Whereas the conventional techniques of row hammer mitigation that are currently implemented in memory systems, to the knowledge of the inventors, fall short in terms of practicality in either energy efficiency and/or space efficiency, the example embodiments of the present disclosure provide a row hammer mitigation technique that provides perfect tracking (i.e., does not allow any false negative row hammer detection) of row hammer attacks in a practical, energy and space efficient manner.

Figure 4:
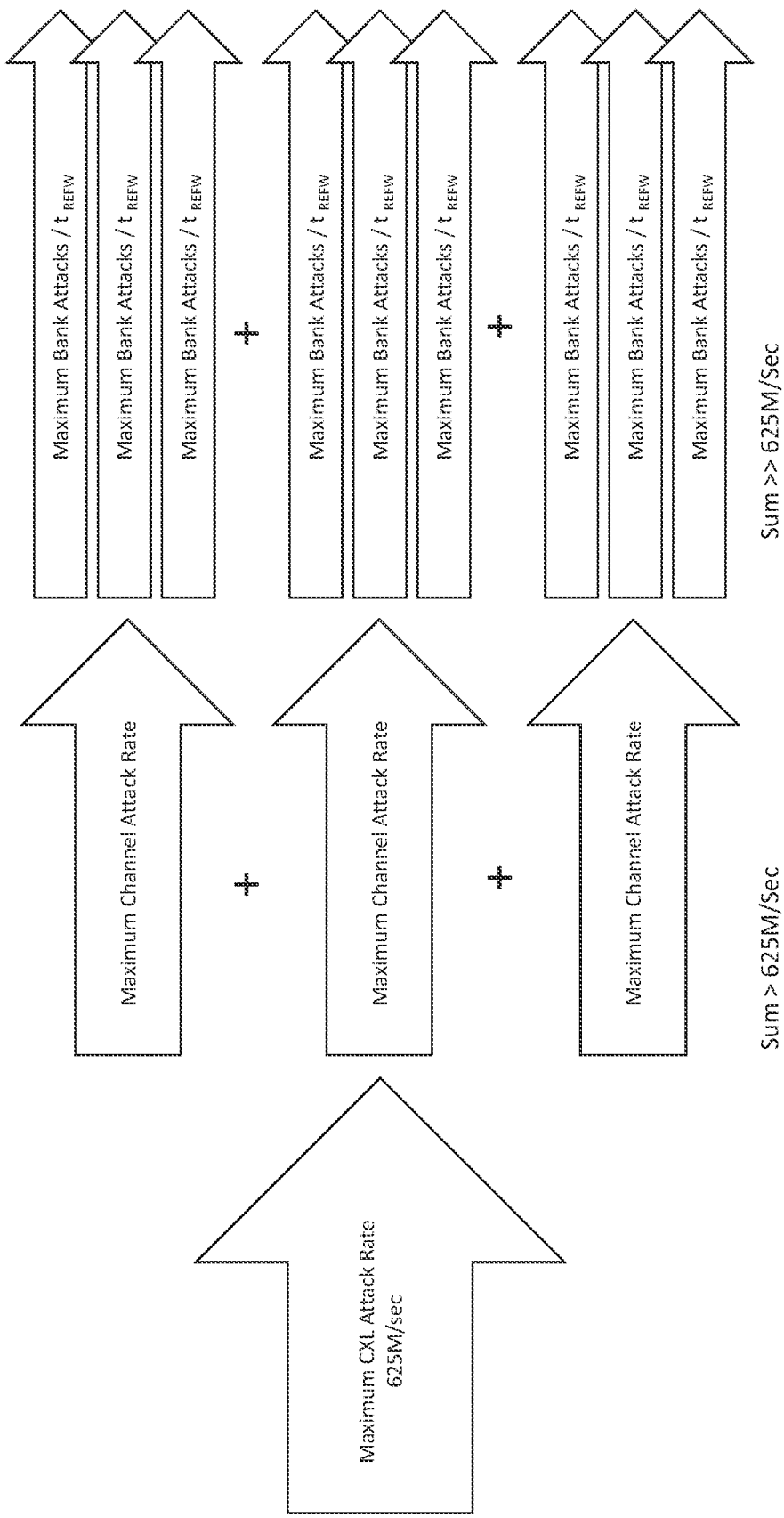
FIG. 4 graphically illustrates an example distribution of row hammer events at the global level in a memory controller, at the channel level and at the bank level.

As shown in FIG. 4, in some example scenarios in which the memory device 126 is formed by a DRAM memory device and the memory controller 100 is formed by a CXL-compliant memory controller, the global rate of row hammer attacks on the memory device 126 may be about 625 million attacks per second. Thus, if perfect row hammer detection is implemented at the global level for the attached memory device, the row hammer detector must be configured with sufficient counters to detect at least that many attacks occurring in the duration of a second. For example, in the example embodiment shown in FIG. 1, if perfect row tracking were to be implemented globally, the central controller 110 could be configured with a row hammer mitigation circuitry that receives row access information for rows in the attached memory device from the media controllers 120 potentially at the rate of 625 million per second, and communicates mitigation responses (e.g., DRFM) to the respective media controllers 120 as needed.

If per-channel row hammer mitigation is implemented for each media controller 120, then the sum of the attack rates that can be handled by the respective media controllers 120 must at least amount to the 625 million/sec, but such an implementation will be capable of, and accordingly use the space and energy resources required, for tracking a substantially higher rate of row updates because the resources are configured on a per channel basis.

Similarly, if per-bank row hammer mitigation is implemented in each bank controller 128 for each bank in a channel, then the sum of attack rates that can be handled by all the bank controllers must at least amount to the 625 million/sec, but such an implementation will be capable of, and accordingly use the space and energy resources required for, detecting a substantially higher detection rate because the resources are configured on a per-bank basis. Thus, the total amount of space and energy resources that may be required to implement row hammer detection at the bank level exceeds the amount of space and energy resources that may be required at the channel level, which in turn exceeds that of the global level implementation.

Thus, various approaches may be considered to achieve perfect (deterministic) row hammer tracking in the memory controller by accessing multiple rows as one unit (same row on different chips) and thus having only one counter for the group, rather than having a counter for each row of the media device.

A motivation for the approach to a solution described in this disclosure is to, instead of having a counter for each and every row of the memory device, bound the number of counters by the number of potential attacks in a timeframe because only so many attacks can happen, for example, in a 60-millisecond timeframe. In example embodiments, the total number of counters and thus the size of the detector and the amount of resources devoted to the detector, is bound by the total potential number of attacks, not the total amount of memory to protect. Thus, in effect, example embodiments provide a detector algorithm that scales with the maximum potential attacks per unit time as opposed to the maximum memory capacity that is being protected.

A problem with having a separate counter for each row is that, as a big system is created, the memory may grow to many millions, if not a billion, rows. Then having a billion counters, one per row, may yield a billion counters. A billion is a lot more than 625 million per second attacks per second being divided 60 milliseconds, which reduces the number of required counters to the thousands instead of the billions or million that would be required to have a counter for each row of protected memory. Thus, embodiments of the present disclosure provide a row hammer detector that scales with the maximum potential attacks per unit time as opposed to the maximum memory capacity being protected.

As noted above, memory device 126 such as, for example, DRAM, can be subject to row hammer attacks, and several approaches are being used to either eliminate or reduce the effects of such attacks. Whereas the conventional techniques of row hammer mitigation that are currently implemented in memory systems, to the knowledge of the inventors, fall short in either energy efficiency and/or space efficiency, the present disclosure provides a row hammer mitigation technique that provides perfect tracking (i.e., does not allow any false negative row hammer detection) of row hammer attacks in practical, energy and space efficient manner.

FIG. 5 illustrates a logical block diagram of a per-bank row hammer mitigation component 132 according to some embodiments. Each per-bank row hammer mitigation component 132 includes a row hammer detection 133. The per-bank row hammer mitigation component 132 is replicated for each bank of the attached memory device 126 that is accessed by the memory controller 100. As shown in FIG. 1, each media controller 120 accessing the media device 126 may have a plurality of per-bank row hammer mitigation components 132, such that each bank controlled by the channel corresponding to that media controller has a corresponding respective per-bank row hammer mitigation component 132.

The per-bank row hammer mitigation component 132 includes a row hammer detector 133 and a SRAM 134. The row hammer detector 133 includes circuitry that monitors the corresponding bank of the memory device 126 for row hammer attacks and when an attack or potential attack is detected, responds appropriately. The SRAM 134 is used by the row hammer detector 133 to maintain counters and other state associated with the row hammer detection of the corresponding bank. Additional required state associated with the row hammer detection may be maintained in d-flip flops associated with the row hammer detector 133.

The "Space Saving" algorithm, which was first described in Metwally et al., "Efficient Computation of Frequent and Top-k Elements in Data Streams," Technical Report 2005-23, University of California, Santa Barbara, September 2005 ("Metwally"), describes a technique to find the most active users of a particular resource or service. One of the use cases described in Metwally is a technique to find a specified number of highest users of a web service. The space saving algorithm can be used to perform deterministic row hammer detection with a lower number of counters than the number of counters that would be required when using a one counter per row in the memory device. Viewed at a high level, the space saving algorithm maintains only the top k (where k may be a predetermined positive number) counters and thus requires much less space for counters. Thus, the space saving algorithm is called space saving because it is only counting the rows that need to be counted as opposed to having a counter for every row. That by definition saves orders of magnitude of space. The Space-saving algorithm gives the CXL controller the opportunity to identify that the DRAM is undergoing a row hammer.

The plurality of per-bank row hammer mitigation components 132, in the embodiments primarily described in this disclosure, are included in the memory controller 100. Including the row hammer mitigation circuitry, for example, the plurality of per-bank row hammer mitigation components 132, in the memory controller 100 is advantageous because all accesses to the memory devices 126 protected by the row hammer mitigation circuitry flow through the memory controller 100. However, embodiments of this disclosure are not limited to implementing the plurality of per-bank row hammer components 132 in the memory controller 100. In some embodiments, the plurality of per-bank row hammer components 132 can be implemented externally to the memory controller. Moreover, embodiments may not be limited to storing the counters in SRAM, and in some embodiments the memory 134 may be a memory type different from SRAM but providing for serial search of the counters.

Figure 6:
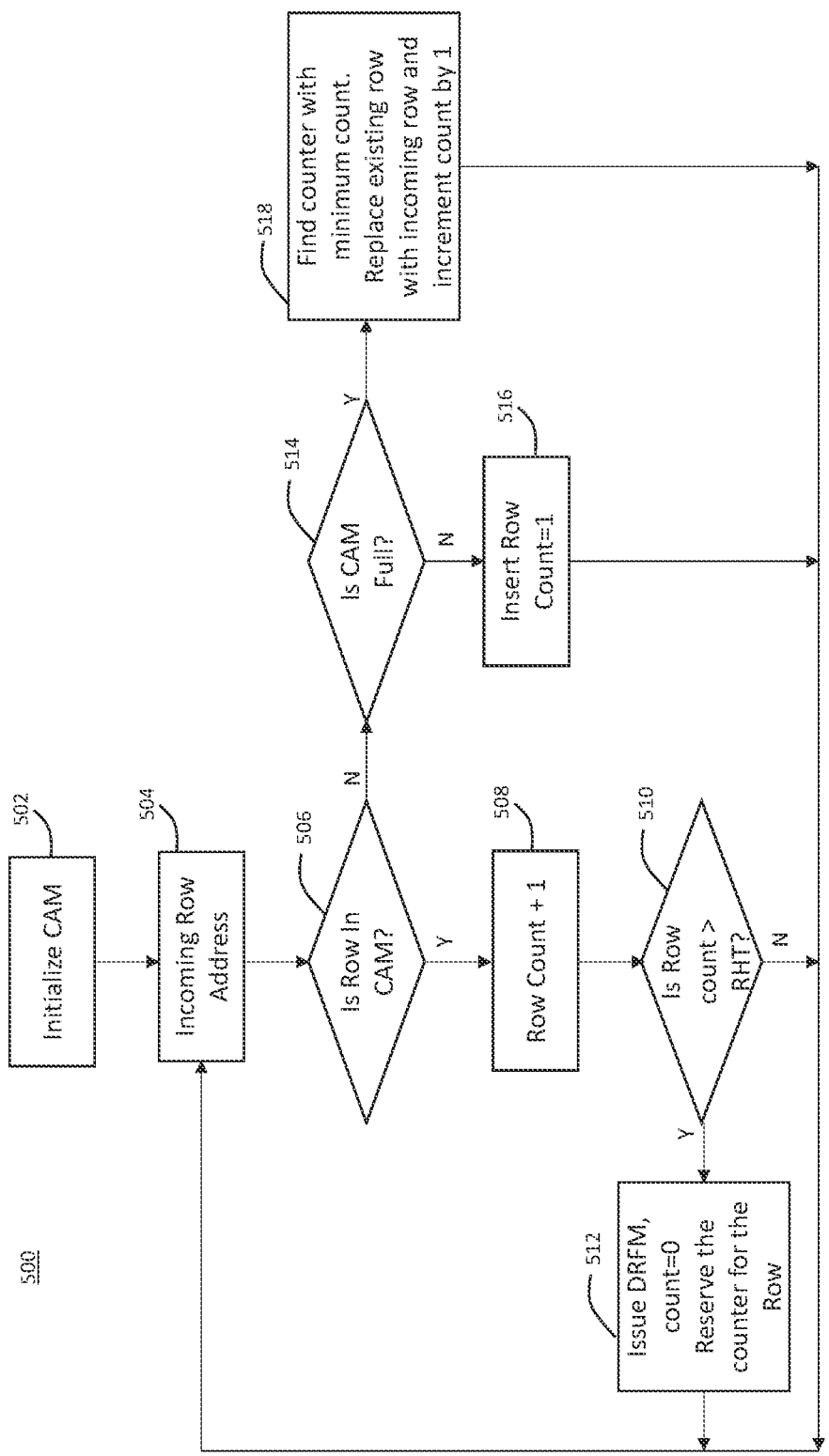
FIG. 6 illustrates a flowchart of a process for row hammer mitigation in accordance with some example embodiments.

FIG. 6 illustrates a flowchart of a process for row hammer mitigation using aspects of the space saving algorithm described in Metwally. As described commonly assigned U.S. Pat. No. 12,182,413 B2 issued Dec. 31, 2024, which is already herein incorporated by reference in its entirety, the "Space Saving" algorithm, when modified and enhanced to address row hammer scenarios, also offers complete, accurate and precise detection of any and all row hammer scenarios. However, as described in U.S. Pat. No. 12,182,413 B2 issued Dec. 31, 2024, the implementation may be prohibitively costly and power intensive requiring both a large content addressable memory (CAM) and magnitude search of the entire detector state.

In the example implementation shown in FIG. 6, a content addressable memory (CAM) is used for maintaining the counters. The RHT may be preconfigured. If n is the maximum row activations during the period, then the CAM total entries is k=n/F, where F is the RHT. The row counter size should at least be log2 (RHT). Each row counter may also have a "reserved" bit. The row address size should at least be log2 (the number of rows in the media (e.g., DRAM) bank). Thus, the total CAM size may be k*(row counter size+reserved bit+row address size).

At operation 502, the CAM is initialized. The CAM initialization may be performed using a ping-pong reset or similar mechanism at each refresh interval (e.g., tREF, the interval at which rows of the memory device are refreshed). At operation 504, an incoming row address is received. The incoming row address is the address of the row in the memory device 126 that is to be next accessed by the memory controller 100. That is, the row address of the aggressor row 207 is received. At operation 506, the CAM is searched for the aggressor row address. The CAM search is a parallel lookup of all CAM entries.

If the aggressor row address is found at operation 506, then at operation 508, the count associated with that aggressor row address is incremented in the CAM. At operation 510, it is determined whether the incremented count exceeds the RHT. As noted earlier in this disclosure, the RHT specifies a number of accesses for a particular row, which when exceeded, makes the system assume that data integrity of physically adjacent rows, victim rows, is compromised. If it is determined, at operation 510, that the RHT is exceeded for the aggressor row address, then at operation 512, a response is triggered be sent to the memory device. The response can be a signal commanding the memory media device to refresh identified victim rows (e.g., DRFM command), and the counter of the aggressor row is reset (e.g., set to 0).

In some embodiments, in association with the counter being refreshed, additionally a flag associated with the aggressor row counter in the CAM is set to indicate that the aggressor row ID is "reserved." In some embodiments, the flag may be a bit, referred to as a "sticky bit" that, when set (e.g., set to 1), indicates that the aggressor row ID is reserved and thus should not be considered in the selection of the minimum count value in operation 518 described below. Consequently, the sticky bit enables subsequent newly inserted rows to be initialized based on the minimum count value in the CAM while ignoring the recently refreshed rows which may have disproportionately low count values compared to most other rows in the table.

If at operation 506 it is determined that the row address is not in the CAM, then at operation 514, it is determined whether the CAM is full. If the CAM is not full, then at operation 516 the incoming row is inserted, and the count associated with the inserted row is incremented.

If at operation 514 it is determined that the CAM is full, then at operation 518, a row which has the lowest count in the CAM is identified, and that row is replaced in the CAM with the new row. The value of the counter is incremented—effectively introducing the new row to the CAM with a starting value of 1 more than the current minimum count in the CAM. Note that, as described in relation to operation 512, in some implementations in which a row in the CAM has a stick bit set, that row may not be considered when identifying the row which has the lowest count.

FIG. 7 is an illustration of the maintenance of a limited number of counters in accordance with the space saving algorithm. In this example, four counters—counter 1, counter 2, counter 3 and counter 4 are maintained. Each counter (e.g., 606) represents a row at a given instance in time and comprises the address (e.g., row number) of the row and a count (e.g., number of accesses to the row) associated with the row. The counters may be initialized at predetermined intervals. 602 represents a sequence of consecutive row access requests as the requests are received in the illustrated time period (between two refreshes). 604 illustrates the row sought to be accessed (aggressor row) in the corresponding request. Requests 1-3 are accesses to rows 9, 7 and 6, respectively.

Since the four counters are unassigned at the beginning of the illustrated period, the counters 1, 2 and 3 are assigned to rows 9, 7 and 6 in response to the requests 1-3. The respective counters are incremented to 1. Request 4 is an access to row 7 which already has an assigned counter, and thus that counter (counter 2) is incremented from 1 to 2. When request 6 is received for row 11, all four counters are already assigned. That is, there are no unassigned counters.

Therefore, a counter with a minimum count value is identified among the assigned counters. In this instance, counters 1, 3 and 4 have the lowest count value of 1, and counter 3 is randomly selected from among the counters with the lowest count values to be reassigned to row 11. Thus, counter 3 is assigned to row 11, but the count value of counter 3 is simply incremented from the current value (i.e., the last value of the counter before the corresponding row is replaced with the selected row)—thus incremented to 2 from 1. By incrementing the count value of the counter even while that counter is reassigned from one row to another, this technique ensures that no row hammer attacks are unaccounted.

Observing requests 10 and 11, it can be seen that counter 4 is reassigned to row 9 at request 10 with an incremented counter value of 2, but then in the very next request is selected again, based on its counter value of 2 being among the lowest counter value at the time, to be reassigned to row 6 with an incremented counter value of 3. Thus, at the end of request 11, row 9 is no longer represented in the counters.

Again, however, at request 13 row 9 is accessed. Thus row 9 is reinserted into the counters by being reassigned to counter 3, which at counter value 2 is among the lowest counter values at the time. When row 9 is reintroduced to the counters at counter 3 its incremented counter value is 3. Therefore, the row access tracking process never decreases the value of a counter during a tracking and therefore never misses a potential row hammer attack even while maintaining a small number of counters compared to the total number of rows being protected.

Due to its capability to provide for deterministic row hammer detection with the use of a substantially smaller number (i.e., smaller than the total number of rows of memory media being protected) of counters, the space saving algorithm can be considered for implementation as a row hammer mitigation technique. However difficult problems are encountered in implementing the space saving algorithm in relation to row hammer detection. When implemented as described above in relation to FIG. 7, the use of a large CAM requires prohibitive amounts of area and power. When the CAM is full, the entire CAM must be scanned in parallel to find a minimum count entry to overwrite. Thus, the implementation of space saving algorithm, for example, as described in relation to FIG. 7, is likely to require either more time than practical or simultaneous comparison of many counter values.

The update loop (e.g., operations 504-506-508-510-512) of the space saving algorithm is similar to the basic row hammer update process shown in FIG. 2. However, the space saving algorithm enables deterministic row hammer mitigation with a much smaller number of counters than techniques that require one counter for each row of the memory device. The space saving algorithm counts only the rows that need to be counted in a time interval, as opposed to having a counter for every row. In some implementations, for example, whereas perfect detection according to conventional row hammer detection may have required several million counters so that each row of memory is represented by a respective counter, the modified space saving algorithm used in process 500 may require a number of counters only in the hundreds thus providing a substantial gain in efficiency and reduction of the size of state to be maintained.

A key reason for the energy inefficiency of the implementation shown in FIG. 7, is the test required to determine "is the row in the CAM" at operation 506. A CAM is a highly associative, that is, a parallel comparison, memory. Thus, even though the space saving algorithm might reduce the problem of tracking row hammer attacks from billions of counters down to thousands, the implementation shown in FIG. 7 still requires accessing and doing thousands comparisons in a short amount of time. For example, to handle 625 million/sec events as described above at a global (i.e., all channels) level, about 62000 events may require to be handled every 60 milliseconds. Such use of a large CAM is highly resource intensive both in terms of silicon area and energy and is therefore may not be practical for use in system environments in which row hammer mitigation is required.

The row hammer mitigation in accordance with FIG. 7 may be implemented in each bank. This would result in each per-bank implementation row hammer mitigation having to process an incoming rate of events that is several orders of magnitude less that what needs to be handled at the global level. However, if implemented in accordance with FIG. 7 with the use of a CAM to perform the lookup at operation 506, in each 60-millisecond time period across all banks as many or more than the number required at the global level described above of the highly resource intensive CAM lookups are required. Thus, it is unlikely that per-bank implementation of the row hammer mitigation according to FIG. 7 would be practical.

It is primarily the highly resource-intensive parallel compare that is required to be replicated across every single bank that causes the implementation to be highly inefficient in terms of resource requirements and thus impractical. Each compare requires that the data required for the compare to be read and compared. When done in parallel in the highly associative CAM, even if each data field read is small (e.g., 16, 20 bits), it is still a large amount of bits that is required to be read and compared very frequently to determine a match. The inventors provide a microarchitecture that can take advantage of the lower event rate that is required to be handled at the per-bank level in a more resource efficient manner so as to make deterministic row hammer mitigation practical in the memory controller.

Despite the above described potential for higher cost, especially for deterministic row hammer detection which requires a highly associative compare, example embodiments implement row hammer detection at the bank level which necessarily means that the replicating beyond what one might otherwise do if one did it somewhere else. This disclosure describes a practical implementation of a modified "space saving" algorithm that requires neither a CAM nor a complete magnitude search of the detector state. Instead, the disclosed row hammer detector implementation, in some embodiments, uses single-port SRAM(s) and a relatively small quantity of temporary state.

As a derivative of the "space saving" algorithm, the disclosed row hammer detection method and apparatus offers provably complete, accurate, and precise row hammer event detection. Its cost and equivalence to perfect tracking enables all row hammer detection to be performed within or in parallel with the memory controller instead of within or partially within the memory media devices. The high precision of the disclosed row hammer detector minimizes the row hammer response rate and consequently minimizes the system performance impact of row hammer scenarios and attacks.

In effect, example embodiments adopt the basic ideas of the space saving algorithm as described in Metwally as modified and used in process 500, breaks down the highly associative comparison and search operation across time such that a smaller amount of search (e.g. fewer read and compare operations are performed) is performed in total for each row access request and that smaller amount of search is performed more slowly on a per-bank basis, when compared to the implementation described in FIG. 7 which uses CAMs that permit very fast parallel search but are costly and consume high amounts of power. Example embodiments take advantage of the fact that the rate of events at a per-bank level at a particular bank is much lower than the global event rate. Example embodiments utilize the time gained (compared to performing operations at the global level) due to processing a smaller number of events per time interval to, instead of doing an associative lookup, perform a serialized search (sequential search) for the aggressor row.

Consequently, instead of looking at all of the thousands of row counters simultaneously, example embodiments look at the first row, then the second row, then at the third, the fourth row, etc. all the way to the last row count in the bank. The lower event rate at the bank level permits the serial search, instead of the parallel search shown in FIG. 6, to be performed at each bank. Moreover, since the search can be terminated when a match if found, on average only half the comparisons that would be typically required in a parallel operation are required to be performed and therefore only half the power requirement. Still further, since the row counters are searched one at a time, the complexity of the circuitry may be substantially less yielding even more of a power saving and an area saving. Consequently, example embodiments provide a much more practical way of performing row hammer mitigation.

Alternative example embodiments for providing a row hammer mitigation process using aspects of the "Space Saving" algorithm as modified and enhanced to address row hammer scenarios, including a SRAM implementation of a modified and enhanced "space saving" algorithm, are disclosed in commonly assigned Docket No: 2021140197-US-2, "Practical and Efficient Row Hammer Error Detection", which is already herein incorporated by reference in its entirety.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "transmit", "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components.

In some examples, the flow of signals between the connected components may be interrupted for a time, for example, using one or more intermediate components such as switches or transistors. The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed. A second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed. A second condition or action may occur directly as a result of the previous condition or action occurring independent of whether other conditions or actions occur. In some examples, a first condition or action may be performed and a second condition or action may occur directly as a result of the previous condition or action occurring, such that no other intermediate conditions or actions occur between the earlier condition or action and the second condition or action. A limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array or memory device, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the "processing circuitry" and/or various illustrative blocks and components described in connection with the disclosure herein (including the claims) may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A device comprising:
   a first interface configured to communicate with a host computing device;
   a second interface configured to communicate with a memory media device;
   a multi-layer detector including a row hammer detector for a memory controller and a row hammer detector for the memory media device that can be configured to perform simultaneous row hammer detection; and
   a processing circuitry at least configured to:
   implement a row hammer mitigation operation configured to:
      detect, using the row hammer detector for the memory media device, a row hammer attack and the row hammer detector for the memory media device generates and transmits a signal that indicates detection of the row hammer attack;
      receive at the memory controller the signal that indicates detection of the row hammer attack on the memory media device;
      generate by the memory controller an interrupt in response to the signal that indicates the detection of the row hammer attack; and
   communicate the interrupt to the host computing device.

2. The device of claim 1, wherein the processing circuitry is further configured to:
   receive a command, generated based on the interrupt, from the host computing device to terminate memory media operations associated with a thread/process causing the Row hammer attack.

3. The device of claim 2, wherein the row hammer mitigation operation includes:
   refreshing particular rows of memory in the memory media device that are adjacent to a memory row in the memory media device that is involved in the row hammer attack.

4. The device of claim 2, wherein the row hammer mitigation operation includes reducing an amount of data traffic to the memory media device.

5. The device of claim 1, wherein the processing circuitry is further configured to:
   count a number of activations of a row of memory of the memory media device;
   determine if the counted number of activations exceeds a threshold number of activations; and
   upon determination that the number of activations exceeds the threshold number of activations, generate the signal that indicates the detection of the row hammer attack.

6. The device of claim 1, wherein the processing circuitry is further configured to
   communicate additional information to the host computing device, the additional information identifying a row address of a row of memory of the memory media device that is involved in the row hammer attack.

7. The device of claim 1, wherein the processing circuitry is further configured to predict that the row hammer attack will occur in order to generate the signal that indicates detection of the row hammer attack based on a prediction.

8. The device of claim 1, wherein the processing circuitry is further configured to:
   detect the row hammer attack and generate the signal that indicates the detection of the row hammer attack;
   receive another signal that indicates another detection of the row hammer attack from the memory media device; and
   generate another interrupt in response to receipt of another signal that indicates another detection of the row hammer attack and communicate another interrupt to the host computing device.

9. The device of claim 1, further comprises:
   a counter configured to count a number of activations of a row of memory of the memory media device;
   the processing circuitry is further configured to perform a row access tracking process with a limited number of counters, wherein a number of counters is comparatively much smaller than a total number of rows in the memory media device; and
   wherein the row access tracking process with the limited number of counters is configured to assign the counter to the row of memory of the memory media device by identifying the counter having a lowest count value and incrementing the lowest count value of the counter while the counter is being reassigned from the row to another row.

10. A method comprising:
    utilizing a multi-layer detector including a row hammer detector for a memory controller and a row hammer detector for a memory media device that can be configured to perform simultaneous row hammer detection;
    detecting, using the row hammer detector for the memory media device, a row hammer attack and the row hammer detector for the memory media device generates and transmits a signal that indicates detection of the row hammer attack;
    receiving at the memory controller the signal that indicates detection of the row hammer attack on the memory media device;
    generating by the memory controller an interrupt in response to the signal that indicates the detection of the row hammer attack; and
    communicating the interrupt to a host computing device.

11. The method of claim 10, further comprising:
    receiving a command, generated based on the interrupt, from the host computing device to perform a row hammer mitigation operation; and
    perform the row hammer mitigation operation in response to the received command.

12. The method of claim 11, wherein the row hammer mitigation operation includes activating particular rows of memory in the memory media device that are adjacent to a memory row in the memory media device that is involved in the row hammer attack.

13. The method of claim 11, wherein the row hammer mitigation operation includes reducing an amount of data traffic to the memory media device.

14. The method of claim 10, wherein:
    the detection of the row hammer attack is performed by the memory controller operatively coupled between the host computing device and the memory media device.

15. The method of claim 10, wherein:
    the signal that indicates the detection of the row hammer attack is received from the memory media device;
    the receiving of the signal that indicates the detection of the row hammer attack is performed by the memory controller operatively coupled between the host computing device and the memory media device; and
    the generating of the interrupt is performed by the memory controller in response to the receiving, from the memory media device, of the signal that indicates the detection of the row hammer attack.

16. The method of claim 10, further comprising:
counting a number of activations of a row of memory of the memory media device;
determining if the counted number of activations exceeds a threshold number of activations; and
upon determination that the number of activations exceeds the threshold number of activations, generating the signal that indicates the detection of the row hammer attack.

17. The method of claim 10, further comprising:
communicating additional information to the host computing device, the additional information identifying a row address of a row of memory of the memory media device that is involved in the row hammer attack.

18. The method of claim 10, further comprising
predicting that the row hammer attack will occur in order to generate the signal that indicates detection of the row hammer attack based on a prediction.

19. The method of claim 10, further comprising:
detecting, by the memory controller, the row hammer attack and generating the signal that indicates the detection of the row hammer attack;
receiving, from the memory media device, another signal that indicates another detection of the row hammer attack; and
generating another interrupt in response to receipt of another signal that indicates the another detection of the row hammer attack, and communicate the another interrupt to the host computing device.

20. The method of claim 10, further comprises:
providing a counter configured to count a number of activations of a row of memory of the memory media device;
performing a row access tracking process with a limited number of counters, wherein a number of counters is comparatively much smaller than a total number of rows in the memory media device; and
wherein the row access tracking process with the limited number of counters is configured to assign the counter to the row of memory of the memory media device by identifying the counter having a lowest count value and incrementing the lowest count value of the counter while the counter is being reassigned from the row to another row.

* * * * *